United States Patent
Noguchi (10) Patent No.: US 10,983,735 B2
(45) Date of Patent: Apr. 20, 2021

(54) MANAGEMENT APPARATUS AND NON-TRANSITORY COMPUTER READABLE MEDIUM

(71) Applicant: FUJI XEROX CO., LTD., Tokyo (JP)

(72) Inventor: Soshi Noguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 150 days.

(21) Appl. No.: 16/025,322

(22) Filed: Jul. 2, 2018

(65) Prior Publication Data

US 2019/0018625 A1 Jan. 17, 2019

(30) Foreign Application Priority Data

Jul. 12, 2017 (JP) .............................. JP2017-136208

(51) Int. Cl.
*G06F 3/12* (2006.01)
*B33Y 50/00* (2015.01)

(52) U.S. Cl.
CPC ............ *G06F 3/1207* (2013.01); *B33Y 50/00* (2014.12); *G06F 3/1259* (2013.01); *G06F 3/1288* (2013.01); *G06F 3/1287* (2013.01)

(58) Field of Classification Search
None
See application file for complete search history.

(56) References Cited

U.S. PATENT DOCUMENTS

| | | | |
|---|---|---|---|
| 2009/0300123 A1* | 12/2009 | Tsubouchi | H04M 1/72552 709/206 |
| 2015/0244991 A1* | 8/2015 | Noda | H04N 7/181 348/158 |
| 2016/0378584 A1* | 12/2016 | Oku | G06F 11/079 358/1.14 |
| 2017/0109198 A1* | 4/2017 | Sugimoto | G06F 3/1208 |
| 2018/0079118 A1* | 3/2018 | Nishiura | H04N 1/00411 |

FOREIGN PATENT DOCUMENTS

JP 2016-173730 A 9/2016

\* cited by examiner

*Primary Examiner* — Frantz Bataille
(74) *Attorney, Agent, or Firm* — Oliff PLC (57) ABSTRACT

A management apparatus includes a predicting unit and a notifying unit. The predicting unit acquires progress information indicating progress of an image forming process from an image forming device that forms a three-dimensional image, and predicts a completion time of the image forming process. The notifying unit provides a notification about the completion time predicted by the predicting unit to a device owned by a user using the image forming device. The predicting unit re-predicts the completion time as the image forming process progresses. In a case where a difference between a previously-notified completion time and a newly-predicted completion time reaches a predetermined extent, the notifying unit provides a notification about the newly-predicted completion time.

7 Claims, 7 Drawing Sheets

| No. | ITEM | VALUE |
|---|---|---|
| 1 | SHAPING START TIME | 03/15/2017 12:00 |
| 2 | DESIGNED HEIGHT [mm] | 120 |
| 3 | SHAPED HEIGHT [mm] | 36 |
| 4 | WAITING PERIOD [min] | 3 |
| 5 | PREVIOUSLY-NOTIFIED PREDICTED COMPLETION TIME | 03/15/2017 15:05 |
| 6 | LATEST PREDICTED COMPLETION TIME | 03/15/2017 15:20 |
| 7 | DIFFERENCE BETWEEN PREVIOUSLY-NOTIFIED PREDICTED COMPLETION TIME AND LATEST PREDICTED COMPLETION TIME [min] | 15 |
| 8 | RE-NOTIFICATION TIME DIFFERENCE [min] | 10 |

| No. | ITEM | CONTENTS |
|---|---|---|
| 1 | SUBJECT | 3D-PRINTER PRINT JOB: NOTIFICATION OF UPDATE OF PREDICTED COMPLETION TIME |
| 2 | TEXT | 3D-PRINTER PRINT JOB:<br>PREDICTED COMPLETION TIME IS UPDATED.<br>JOB NAME: SHAPE 1<br>JOB ID: 1234<br>PROGRESS: 30%<br>LATEST PREDICTED COMPLETION TIME: 03/15/2017 13:15 |

MANAGEMENT APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-136208 filed Jul. 12, 2017.

BACKGROUND

Technical Field

The present invention relates to management apparatuses and non-transitory computer readable media.

SUMMARY

According to an aspect of the invention, there is provided a management apparatus including a predicting unit and a notifying unit. The predicting unit acquires progress information indicating progress of an image forming process from an image forming device that forms a three-dimensional image, and predicts a completion time of the image forming process. The notifying unit provides a notification about the completion time predicted by the predicting unit to a device owned by a user using the image forming device. The predicting unit re-predicts the completion time as the image forming process progresses. In a case where a difference between a previously-notified completion time and a newly-predicted completion time reaches a predetermined extent, the notifying unit provides a notification about the newly-predicted completion time.

BRIEF DESCRIPTION OF THE DRAWINGS

Exemplary embodiments of the present invention will be described in detail based on the following figures, wherein.

DETAILED DESCRIPTION

Exemplary embodiments of the present invention will be described below with reference to the drawings.

Figure 1:
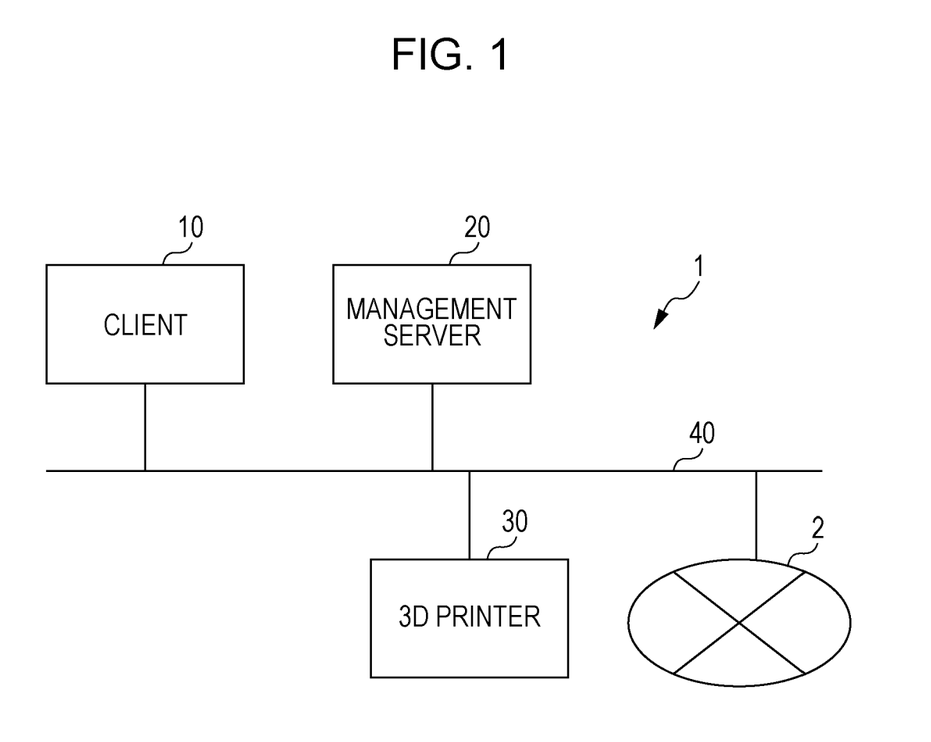
FIG. 1 illustrates a printing system that includes a management server corresponding to a management apparatus according to an exemplary embodiment of the present invention.

FIG. 1 illustrates a printing system that includes a management server corresponding to a management apparatus according to an exemplary embodiment of the present invention.

A printing system 1 according to this exemplary embodiment includes a client terminal 10, a management server 20, and a three-dimensional (3D) printer 30 as system components, and these system components are connected to one another by a communication network, such as a local area network (LAN) 40, and are also connected to an external communication network, such as the Internet 2.

The client terminal 10 is to be operated by a user using the printing system 1 and is, for example, a personal computer as hardware. The user may operate the client terminal 10 so as to create print data expressing a desired three-dimensional image to be output (printed) by the 3D printer 30 or to load already-created print data. Then, the user may cause the client terminal 10 to transmit the print data to the management server 20, thus causing the 3D printer 30 to execute a process for forming the three-dimensional image. An output material obtained as a result of the image forming process is collected from the 3D printer 30 by the user.

The management server 20 corresponds to the management apparatus according to the exemplary embodiment of the present invention and manages the 3D printer 30. The management server 20 according to this exemplary embodiment is a general-purpose server computer including a central processing unit (CPU), a hard disk device, and semiconductor storage devices, such as a random access memory (RAM) and a read-only memory (ROM), as hardware components. The function of the management apparatus according to the exemplary embodiment of the present invention is realized by loading a management program according to an exemplary embodiment of the present invention into the server computer and causing the server computer to execute the management program. Alternatively, the management apparatus according to the exemplary embodiment of the present invention may be realized by dedicated hardware.

The management server 20 manages various matters in the printing system 1. In this exemplary embodiment, the management server 20 manages, for example, user authorization and authentication, output of print data to the 3D printer 30 or a two-dimensional (2D) printer, and a billing process with respect to the user for the use of the printing system 1.

The 3D printer 30 sequentially forms the three-dimensional image in a layer-by-layer fashion based on the print data expressing the three-dimensional image. Examples of the 3D printer 30 that may be used include a stereolithography type, a selective laser sintering type, a fused deposition modeling type, a binder jet type, and a material jet type. In this exemplary embodiment, the 3D printer 30 used is of a selective laser sintering type as an example.

Figure 2:
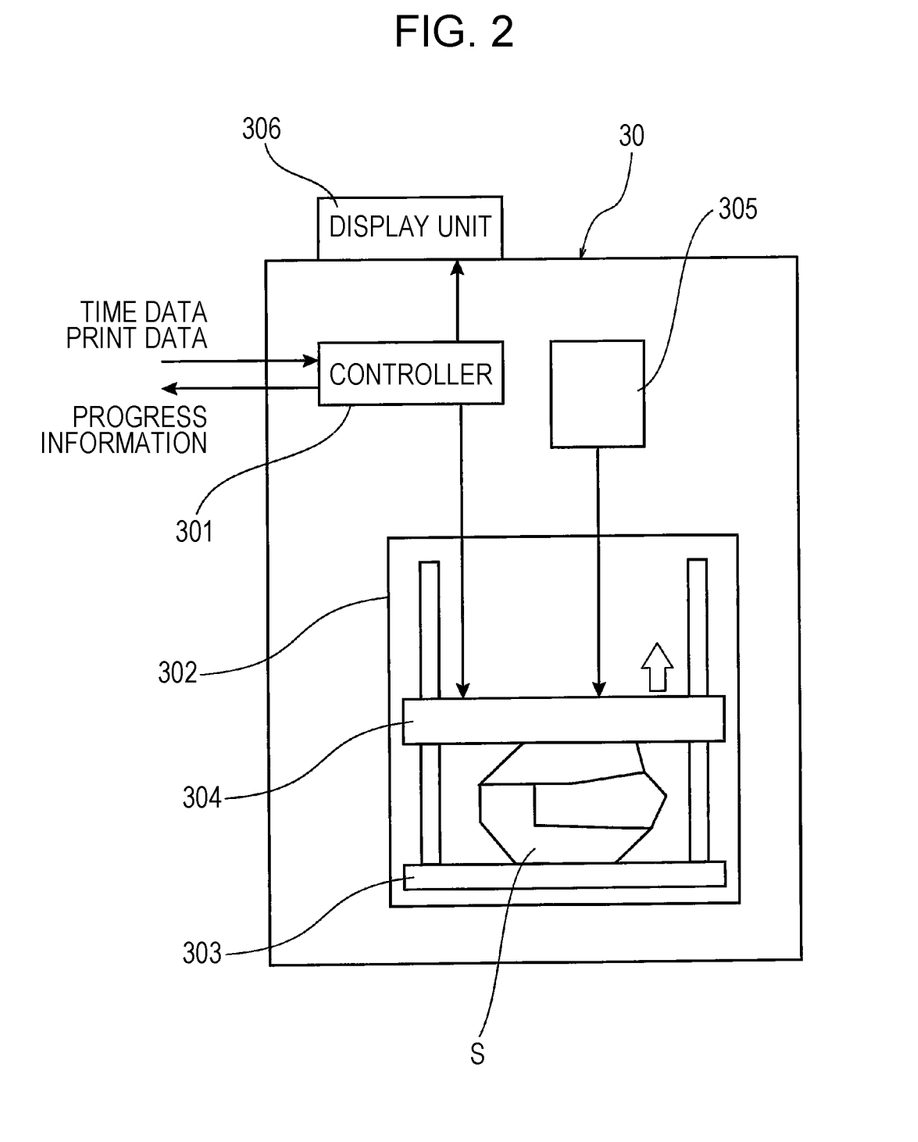
FIG. 2 schematically illustrates the structure of a three-dimensional printer.

The 3D printer 30 will be described in further detail below.

FIG. 2 schematically illustrates the structure of the 3D printer 30.

The 3D printer 30 has a controller 301 and a forming unit 302. The controller 301 receives print data.

The forming unit 302 includes a fixed stage 303 and a movable head 304. The movable head 304 is provided with a radiating mechanism (not shown). The movable head 304 is supplied with a powder material from a material feeder 305. The movable head 304 spreads the powder material in the form of a layer parallel to the fixed stage 303. The powder material is heated by being irradiated with light by the radiating mechanism so as to be sintered, whereby one layer of a three-dimensional image S is formed. Then, the movable head 304 moves away from the fixed stage 303 so that layers are stacked one on top of the other, whereby the three-dimensional image S is formed.

In this 3D printer 30, for example, the time spent by the movable head 304 for spreading the powder material and the time spent by the radiating mechanism of the movable head 304 to heat the powder material are known to vary considerably. As a result, in a case where the time of completion of the image forming process is predicted, a large error of, for example, about 30% normally occurs, whether the prediction is machine-based or human-based.

The operation of the movable head 304 is controlled by the controller 301 in accordance with the print data. The controller 301 creates and outputs progress information indicating the progress in forming the three-dimensional image S.

The 3D printer 30 also includes a display unit 306 having, for example, a liquid crystal screen. In accordance with control by the controller 301 that has received time data, the display unit 306 displays the time indicated by the time data. Moreover, the display unit 306 also displays the progress indicated by the progress information.

Next, the function of the management server 20 shown in FIG. 1 will be described in detail.

Figure 3:
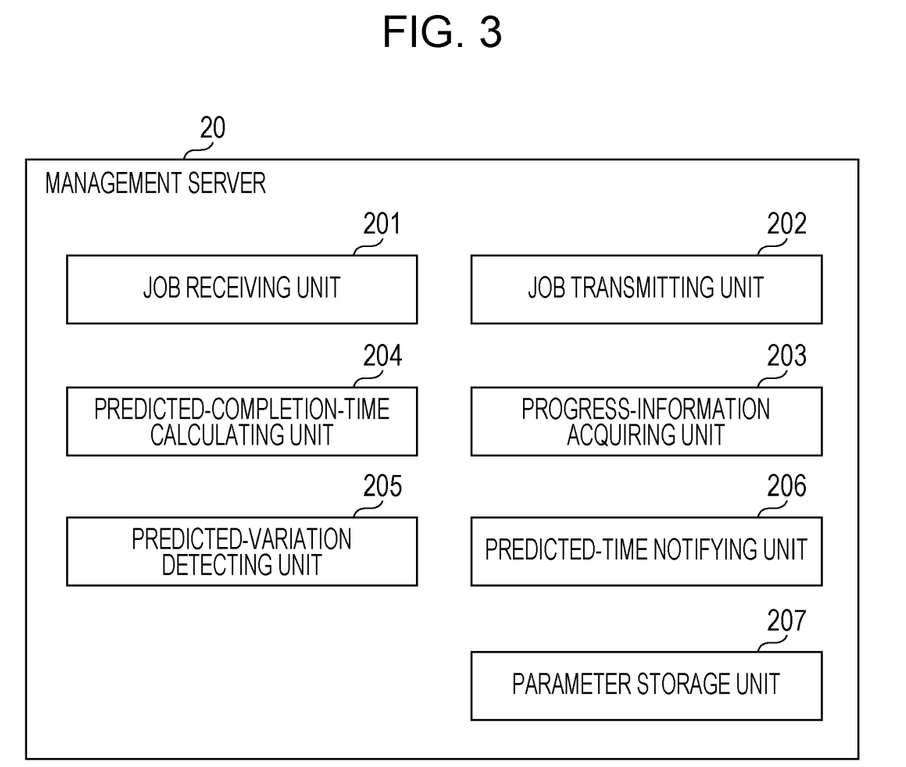
FIG. 3 is a functional block diagram illustrating a functional structure of the management server.

FIG. 3 is a functional block diagram illustrating a functional structure of the management server 20.

In FIG. 3, the functional structure with respect to some of the functions of the management server 20 is shown. As mentioned above, in this exemplary embodiment, the function of the management apparatus according to the exemplary embodiment of the present invention is realized by loading the management program according to the exemplary embodiment of the present invention into a general-purpose server computer and causing the server computer to execute the management program. The functional block diagram in FIG. 3 also expresses the program structure in the management program according to the exemplary embodiment.

The management server 20 includes a job receiving unit 201, a job transmitting unit 202, a progress-information acquiring unit 203, a predicted-completion-time calculating unit 204, a predicted-variation detecting unit 205, a predicted-time notifying unit 206, and a parameter storage unit 207.

The job receiving unit 201 receives the print data as a job from the client terminal 10 shown in FIG. 1.

The job transmitting unit 202 transmits the print data as a job to the 3D printer 30 shown in FIG. 1.

The progress-information acquiring unit 203 acquires the progress information output from the controller 301 of the 3D printer 30.

The predicted-completion-time calculating unit 204 predicts and calculates the time of completion of the image forming process performed by the 3D printer 30 based on the progress information. The predicted-completion-time calculating unit 204 repeatedly calculates the predicted time at certain time intervals. The predicted-completion-time calculating unit 204 corresponds to an example of a predicting unit according to an exemplary embodiment of the present invention.

The predicted-variation detecting unit 205 checks the predicted time calculated repeatedly by the predicted-completion-time calculating unit 204 and detects a large variation that exceeds a predetermined threshold value. The detection by the predicted-variation detecting unit 205 will be described in detail later with reference to a flowchart.

The predicted-time notifying unit 206 notifies the user using the printing system 1 shown in FIG. 1 of the predicted time calculated by the predicted-completion-time calculating unit 204. The notification by the predicted-time notifying unit 206 is not a one-time notification but is performed again if a predicted time that largely differs from the previously-notified predicted time is calculated, that is, if a large variation is detected by the predicted-variation detecting unit 205. Furthermore, the notification by the predicted-time notifying unit 206 is performed by using, for example, electronic mail via the Internet 2 shown in FIG. 1. Therefore, it is convenient for the user in terms of a high degree of freedom in receiving the notification. Moreover, the predicted-time notifying unit 206 transmits the time data indicating the predicted time to the 3D printer 30, and causes the display unit 306 of the 3D printer 30 to display the predicted time.

A combination of the predicted-variation detecting unit 205 and the predicted-time notifying unit 206 corresponds to an example of a notifying unit according to an exemplary embodiment of the present invention, and the predicted-time notifying unit 206 also functions as an example of a display according to an exemplary embodiment of the present invention. Although it is desirable that the notification of the predicted time be performed by using electronic mail, the notifying unit according to the exemplary embodiment of the present invention may perform the notification by using a method other than the electronic-mail-based method.

The parameter storage unit 207 stores parameters to be used in the operation of the management server 20.

Next, the operation of the management server 20 will be described in detail with reference to a flowchart.

Figure 4:
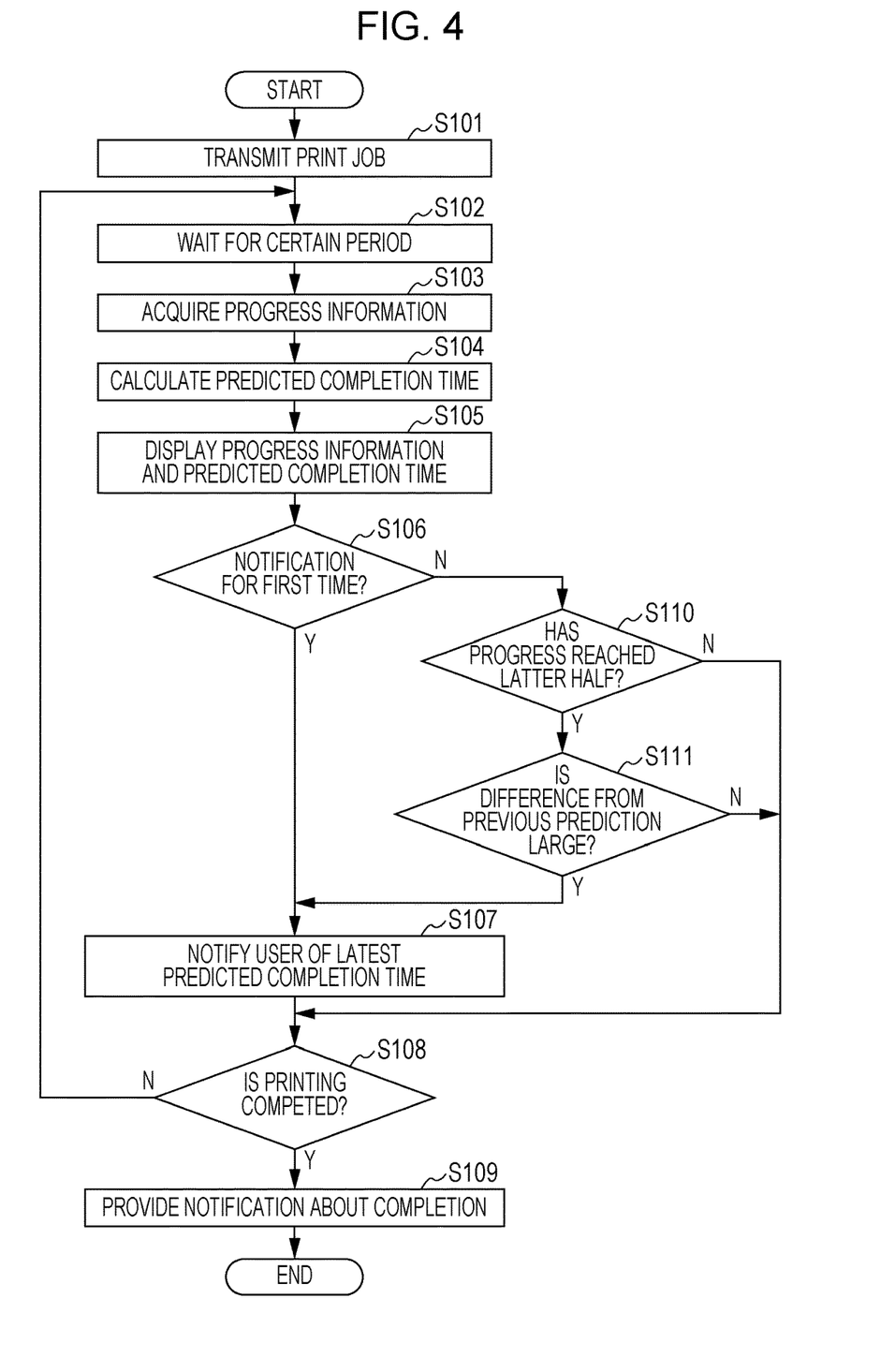
FIG. 4 is a flowchart illustrating the operation of the management server.
Figure 5:
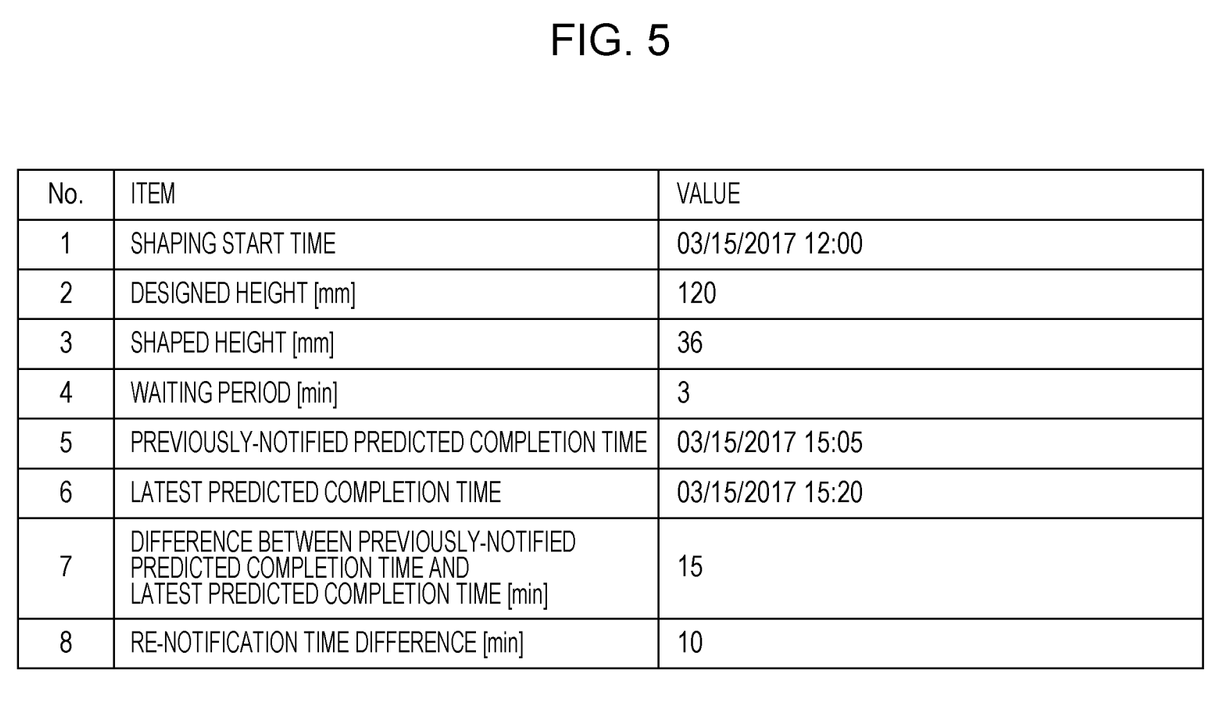
FIG. 5 illustrates an example of parameters stored in a parameter storage unit.

FIG. 4 is a flowchart illustrating the operation of the management server 20. FIG. 5 illustrates an example of parameters stored in the parameter storage unit 207.

The operation shown in the flowchart in FIG. 4 is executed every time the job receiving unit 201 of the management server 20 receives a job from the client terminal 10.

When this operation starts, the job transmitting unit 202 first transmits the job to the 3D printer 30 in step S101. Then, the time of transmission of the job is stored in the parameter storage unit 207 as "shaping start time", which is the first item in FIG. 5, and the height of a three-dimensional image expressed by print data transmitted as the job is stored as "designed height", which is the second item in FIG. 5. In the example shown in FIG. 5, "03/15/2017 12:00" is stored as a value of "shaping start time", and "120" is stored as a value of "designed height".

When a certain waiting period elapses in step S102 after the transmission of the job, the progress-information acquiring unit 203 acquires, for example, the height of the shaped three-dimensional image S as progress information from the 3D printer 30 in step S103. With regard to the waiting period in step S102, for example, "3" minutes is stored as "waiting period", which is the fourth item in FIG. 5. With regard to the progress information acquired in step S103, for example, "36" mm is stored as "shaped height", which is the third item in FIG. 5.

When the progress information is acquired, the predicted-completion-time calculating unit 204 calculates the predicted time of completion of the image forming process based on the progress information in step S104. The predicted completion time is calculated in accordance with the following calculation expressions:

$$\text{Predicted Completion Time} = \text{Shaping Start Time} + \text{Elapsed Time} \times 100/\text{Progress Rate}$$

$$\text{Elapsed Time} = \text{Current Time} - \text{Shaping Start Time}$$

$$\text{Progress Rate} = (\text{Shaped Height}/\text{Designed Height}) \times 100$$

In these calculation expressions, when the predicted time is to be calculated based on the progress information, information indicated by the print data, such as the designed height, is used. Alternatively, for example, in a case where the progress rate is obtained as the progress information, the predicting unit according to the exemplary embodiment of the present invention may calculate the predicted time based on the progress information alone.

The predicted completion time calculated by the predicted-completion-time calculating unit 204 is stored as "latest predicted completion time", which is the sixth item in FIG. 5. In the example shown in FIG. 5, "03/15/2017 15:20" is stored as a value of "latest predicted completion time".

Furthermore, time data indicating the predicted completion time calculated by the predicted-completion-time calculating unit 204 is transmitted to the 3D printer 30 by the predicted-time notifying unit 206. In the 3D printer 30, the progress indicated by the progress information and the predicted completion time indicated by the time data are displayed on the display unit 306 in step S105. A display example will now be described.

Figure 6:
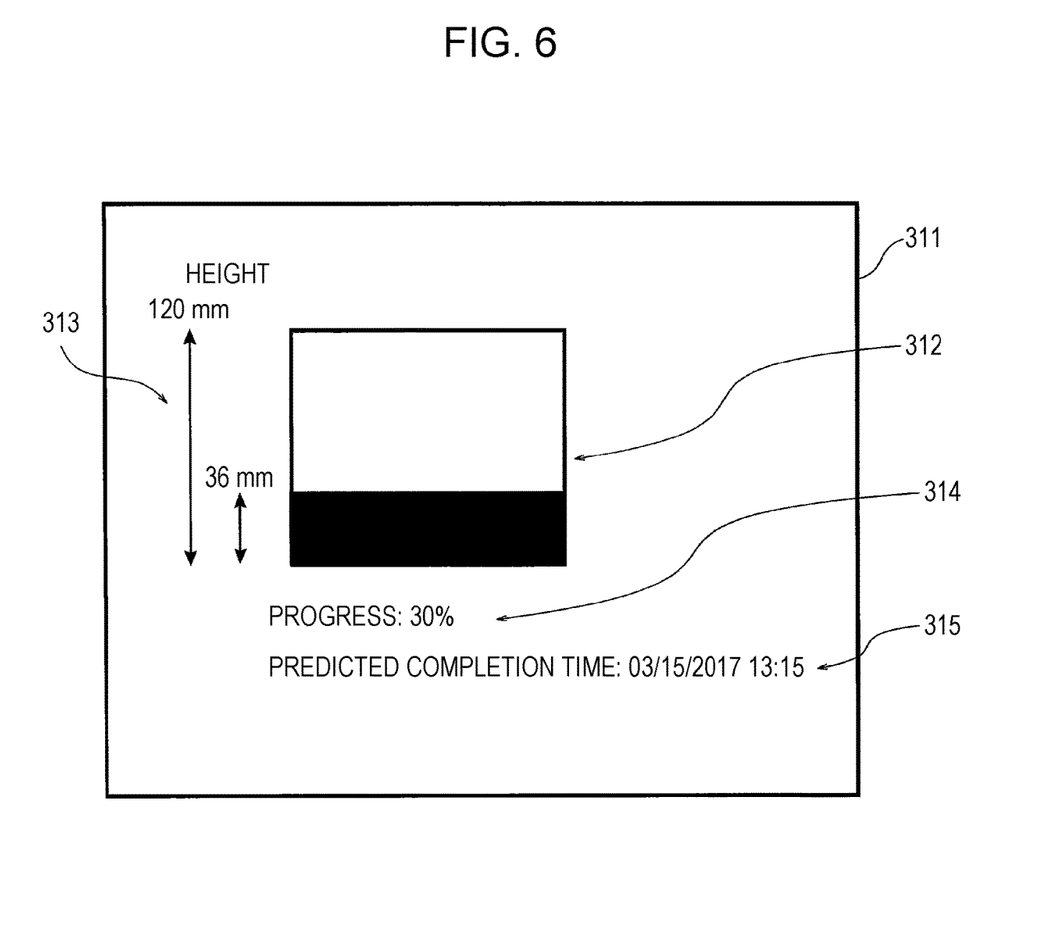
FIG. 6 illustrates a display example in a display unit.

FIG. 6 illustrates a display example in the display unit 306.

In FIG. 6, a display screen 311 included in the display unit 306 is shown. On the display screen 311, a progress chart 312 visually expressing the progress is displayed, and a height display section 313 indicating a height corresponding to the progress chart 312 is displayed next to the progress chart 312. Moreover, a progress-rate display section 314 numerically expressing the progress is displayed below the progress chart 312, and a predicted completion time 315 is displayed below the progress-rate display section 314.

When the progress and the predicted completion time are displayed on the display unit 306 in this manner, it is subsequently determined in step S106 in FIG. 4 whether or not the current notification about the predicted time provided to the user is performed for the first time. If the notification is performed for the first time (Yes in step S106), the predicted-time notifying unit 206 notifies the user of the latest predicted completion time by using electronic mail in step S107. This notified predicted completion time is stored as "previously-notified predicted completion time", which is the fifth item in FIG. 5. In the example in FIG. 5, "03/15/2017 15:05" is stored as a value of "previously-notified predicted completion time".

After the notification of the predicted completion time, it is determined in step S108 whether or not the image forming (printing) process performed by the 3D printer 30 is completed. If the image forming process is completed (Yes in step S108), the predicted-time notifying unit 206 notifies the user that the image forming process is completed, and the operation in FIG. 4 ends. In contrast, if the image forming (printing) process performed by the 3D printer 30 is not completed yet (No in step S108), the operation returns to step S102 described above, and the above-described operation is repeated.

In step S106, if the notification is performed for the second time or more (No in step S106), the predicted-time notifying unit 206 determines in step S110 whether or not the progress has reached the latter half of the image forming process. If the progress is still in the first half of the image forming process (No in step S110), the notification is not performed since frequent notifications of the predicted time may be troublesome. In this case, the operation proceeds to step S108 and step S109. If the progress has reached the latter half of the image forming process (Yes in step S110), the predicted-variation detecting unit 205 determines in step S111 whether or not a difference between the previously-notified predicted completion time and the latest predicted completion time is larger than a predetermined threshold value. The difference between the previously-notified predicted completion time and the latest predicted completion time is stored as the seventh item in FIG. 5, and the threshold value is stored as "re-notification time difference", which is the eighth item in FIG. 5. In the example shown in FIG. 5, "15" minutes is indicated as the difference between the predicted completion times, and "10" minutes is indicated as "re-notification time difference". Although the threshold value corresponding to "re-notification time difference" is indicated as a fixed value in FIG. 5, the threshold value in this exemplary embodiment is set in association with the progress rate of the image forming process in the 3D printer 30, such that the threshold value decreases with increasing progress rate. For example, the threshold value is changed in accordance with the progress of the image forming process such that the threshold value is "20" minutes when the progress rate is below 70%, the threshold value is "10" minutes when the progress rate is between 70% and 80%, and the threshold value is "5" minutes when the progress rate exceeds 80%. Therefore, the notification of the update of the predicted completion time is performed more frequently as the image forming process progresses, thereby allowing the user to know the predicted completion time more accurately.

If the determination result obtained in step S111 indicates that the difference is large (Yes in step S111), the operation proceeds to step S107 where the notification of the predicted completion time is performed. Subsequently, the operation proceeds to step S108 and step S109, similarly to the above.

Figure 7:
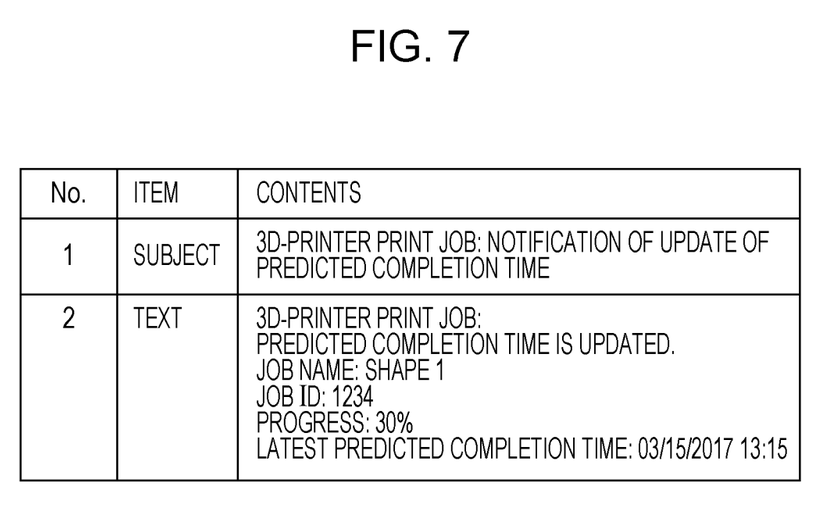
FIG. 7 illustrates an example of a notification of a predicted completion time.

FIG. 7 illustrates an example of a notification of the predicted completion time.

As mentioned above, the notification of the predicted completion time is performed by using electronic mail in this exemplary embodiment. As the "Subject" of the electronic mail, for example, the subject "3D-Printer Print Job: Notification of Update of Predicted Completion Time" is used. In the "Text" section, the message "3D-Printer Print Job: Predicted Completion Time is Updated" and "Job Name" and "Job ID" as information for identifying the job being processed are indicated. The "Text" section also indicates the progress rate indicating the progress of the job (i.e., 30% in the example in FIG. 5), as well as "Latest Predicted Completion Time".

Accordingly, the notification is performed in a case where the determination result obtained in step S111 in FIG. 4 indicates that the difference is large, whereas the notification is not performed in a case where the determination result obtained in step S111 indicates that the difference is small (No in step S111), and the operation subsequently proceeds to step S108 and step S109.

Accordingly, the notification is performed in a case where the latest predicted time largely differs from the previous predicted time, so that the user readily obtains an accurate predicted time while excessive notifications are suppressed, whereby the user may collect the output material at an appropriate timing. This may result in an increased operating rate of the 3D printer 30.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A management apparatus comprising:
a processor programmed to
acquire progress information indicating progress of an image forming process from an image forming device that forms a three-dimensional image, and predict a completion time of the image forming process, and
provide a notification about the predicted completion time of the image forming process in the image forming device to a device owned by a user using the image forming device,
wherein the processor re-predicts the completion time of the image forming process in the image forming device as the image forming process progresses, and
wherein, in a case where a difference between a previously-notified completion time and a newly-predicted completion time reaches a predetermined extent, the processor provides a notification about the newly-predicted completion time.

2. The management apparatus according to claim 1, wherein
the processor causes a display included in the image forming device to display the predicted completion time.

3. The management apparatus according to claim 1, wherein
the processor minimizes the notification about the newly-predicted completion time until the progress of the image forming process reaches a predetermined extent, as compared with the notification after the progress of the image forming process reaches the predetermined extent.

4. The management apparatus according to claim 1, wherein
the processor provides the notification about the newly-predicted completion time at a first time point if the difference at the first time point is larger than the difference at a second time point at which the image forming progress has progressed further than the first time point.

5. The management apparatus according to claim 1, wherein
the processor provides the notification about the completion time by using electronic mail.

6. A non-transitory computer readable medium storing a management program loaded in an information processing apparatus and causing the information processing apparatus to operate as a management apparatus that executes a process, the process comprising:
acquiring progress information indicating progress of an image forming process from an image forming device that forms a three-dimensional image, and predicting a completion time of the image forming process; and
providing a notification about the predicted completion time of the image forming process in the image forming device to a device owned by a user using the image forming device,
wherein the completion time of the image forming process in the image forming device is re-predicted as the image forming process progresses, and
wherein, in a case where a difference between a previously-notified completion time and a newly-predicted completion time reaches a predetermined extent, a notification about the newly-predicted completion time is provided.

7. A management apparatus comprising:
predicting means for acquiring progress information indicating progress of an image forming process from an image forming device that forms a three-dimensional image, and predicting a completion time of the image forming process; and
notifying means for providing a notification about the completion time of the image forming process in the image forming device predicted by the predicting means to a device owned by a user using the image forming device,
wherein the predicting means re-predicts the completion time of the image forming process in the image forming device as the image forming process progresses, and
wherein, in a case where a difference between a previously-notified completion time and a newly-predicted completion time reaches a predetermined extent, the notifying means provides a notification about the newly-predicted completion time.

* * * * *